United States Patent
Mefford et al.

(10) Patent No.: US 10,296,790 B2
(45) Date of Patent: May 21, 2019

(54) CODED VISUAL MARKERS FOR A SURVEILLANCE SYSTEM

(71) Applicant: The Boeing Company, Chicago, IL (US)

(72) Inventors: David K. Mefford, Brownsboro, AL (US); Aaron Y. Mosher, Madison, AL (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/661,694

(22) Filed: Jul. 27, 2017

(65) Prior Publication Data

US 2019/0034721 A1    Jan. 31, 2019

(51) Int. Cl.
G06K 9/00 (2006.01)
G06K 9/20 (2006.01)
G06K 7/10 (2006.01)

(52) U.S. Cl.
CPC ..... *G06K 9/00577* (2013.01); *G06K 7/10366* (2013.01); *G06K 9/00771* (2013.01); *G06K 9/2036* (2013.01); *G06K 2009/0059* (2013.01)

(58) Field of Classification Search
None
See application file for complete search history.

(56) References Cited

U.S. PATENT DOCUMENTS

| | | | | |
|---|---|---|---|---|
| 5,283,644 A | * | 2/1994 | Maeno | H04N 7/18 348/152 |
| 9,208,675 B2 | | 12/2015 | Xu et al. | |
| 9,380,225 B2 | | 6/2016 | Tiscareno et al. | |
| 2013/0153651 A1 | * | 6/2013 | Fedorovskaya | G06K 9/2036 235/375 |
| 2014/0198383 A1 | * | 7/2014 | Tsao | G02B 27/2285 359/478 |
| 2014/0294250 A1 | * | 10/2014 | Aoki | G06F 21/32 382/115 |

* cited by examiner

*Primary Examiner* — Stephen P Coleman
(74) *Attorney, Agent, or Firm* — Duft & Bornsen, PC

(57) ABSTRACT

Systems and methods for coded visual markers in a surveillance system. An exemplary system includes a camera to capture images of a secure area, memory to store identifiers for persons that are authorized to be in the secure area, and a processor communicatively coupled with the camera and the memory. The processor analyzes the images to detect a person in the secure area and detects a pattern of a light source at the person. The processor then decodes the pattern of the light source and authorizes the person in the secure area based on a match between the decoded pattern of the light source and an identifier stored in the memory of one of the persons authorized to be in the secure area.

20 Claims, 5 Drawing Sheets

CODED VISUAL MARKERS FOR A SURVEILLANCE SYSTEM

FIELD

This disclosure relates to the field of surveillance systems, and more particularly, to validating personnel in a surveilled area.

BACKGROUND

Many entities have facilities with secured areas where only trusted personnel are allowed. To secure an area and validate personnel, the entity may employ some combination of various surveillance equipment including cameras, motion detectors, radio frequency identification (RFID) tags/readers, and face recognition or other biometric systems. However, traditional surveillance cameras require continuous monitoring by security personnel. Motion detectors often trigger false alerts when trusted personnel such as security officers, maintenance workers, and authorized employees are present in the scene. RFID tags are restricted to areas that are in close proximity to reader points. Face recognition systems are often unreliable at long-ranges, in different lighting conditions, and in instances for which that camera is unable to provide a clear, high-resolution view of a person's face.

SUMMARY

Embodiments described herein use coded visual markers in a surveillance system. Surveillance cameras detect patterns of light emitted from a light source that is attached to a person, such as visible light or near infrared radiation (IR), or simply referred to as infrared (IR). Each pattern is encoded uniquely for a particular person to securely and reliably validate personnel in automated fashion. Since the visible light or near IR radiation is detectable by the cameras at relatively large distances, the surveillance system may secure large areas with minimal cost and validate personnel at long ranges, inside vehicles, and in various lighting conditions. If a pattern is not detected or recognized in a scene, the surveillance system may generate an alert or initiate an automated threat procedure with existing security equipment.

One embodiment is a system that includes a camera configured to capture images of a secure area, memory configured to store identifiers for persons that are authorized to be in the secure area, and a processor communicatively coupled with the camera and the memory. The processor is configured to analyze the images to detect a person in the secure area and to detect a pattern of a light source attached to the person. The processor is configured to decode the pattern emitted by the light source, and authorize the person in the secure area based on a match between the decoded pattern of the light source and an identifier stored in the memory of one of the persons authorized to be in the secure area.

Other exemplary embodiments (e.g., methods and computer-readable media relating to the foregoing embodiments) may be described below. The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
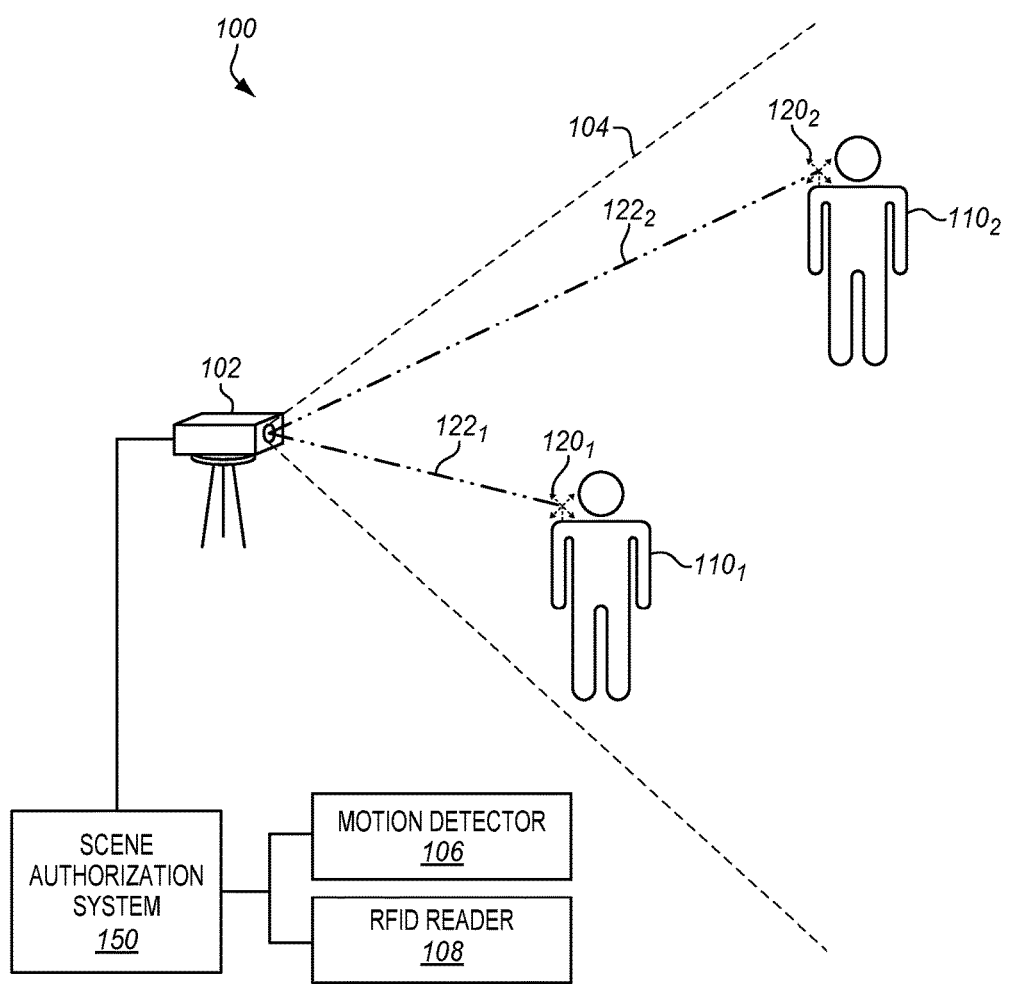
FIG. 1 illustrates a surveillance system in an exemplary embodiment.

FIG. 1 illustrates a surveillance system 100 in an exemplary embodiment. The surveillance system 100 includes one or more camera(s) 102 having a field of view 104 that defines or is part of a secure area. One or more person(s) 110 may be located within the field of view 104 of the camera 102. The surveillance system 100 may also include other types of traditional security equipment such as one or more motion detector(s) 106, RFID reader(s) 108, etc. While some types of traditional surveillance equipment, such as a face recognition system or the RFID reader 108, is able to validate the identity of the person 110, these systems are limited to close-range authentication.

The surveillance system 100 is therefore enhanced with a scene authorization system 150 that is able to interact with the camera 102 to validate the identity of the persons 110 within the field of view 104 of the camera 102. To do this, the surveillance system 100 deploys emitter device(s) 120 that may each be attached to, or in the possession of, one of the persons 110. The emitter device 120 includes any system, device, or component operable to emit an encoded pattern 122 of visible light or near infrared (IR) light. As illustrated by the dashed/dotted lines in FIG. 1, the encoded pattern 122 is unique to the emitter device 120. The scene authorization system 150 is configured to decode the encoded patterns 122 to determine whether the persons 110 within the field of view 104 are authorized to be in the area.

Figure 2:
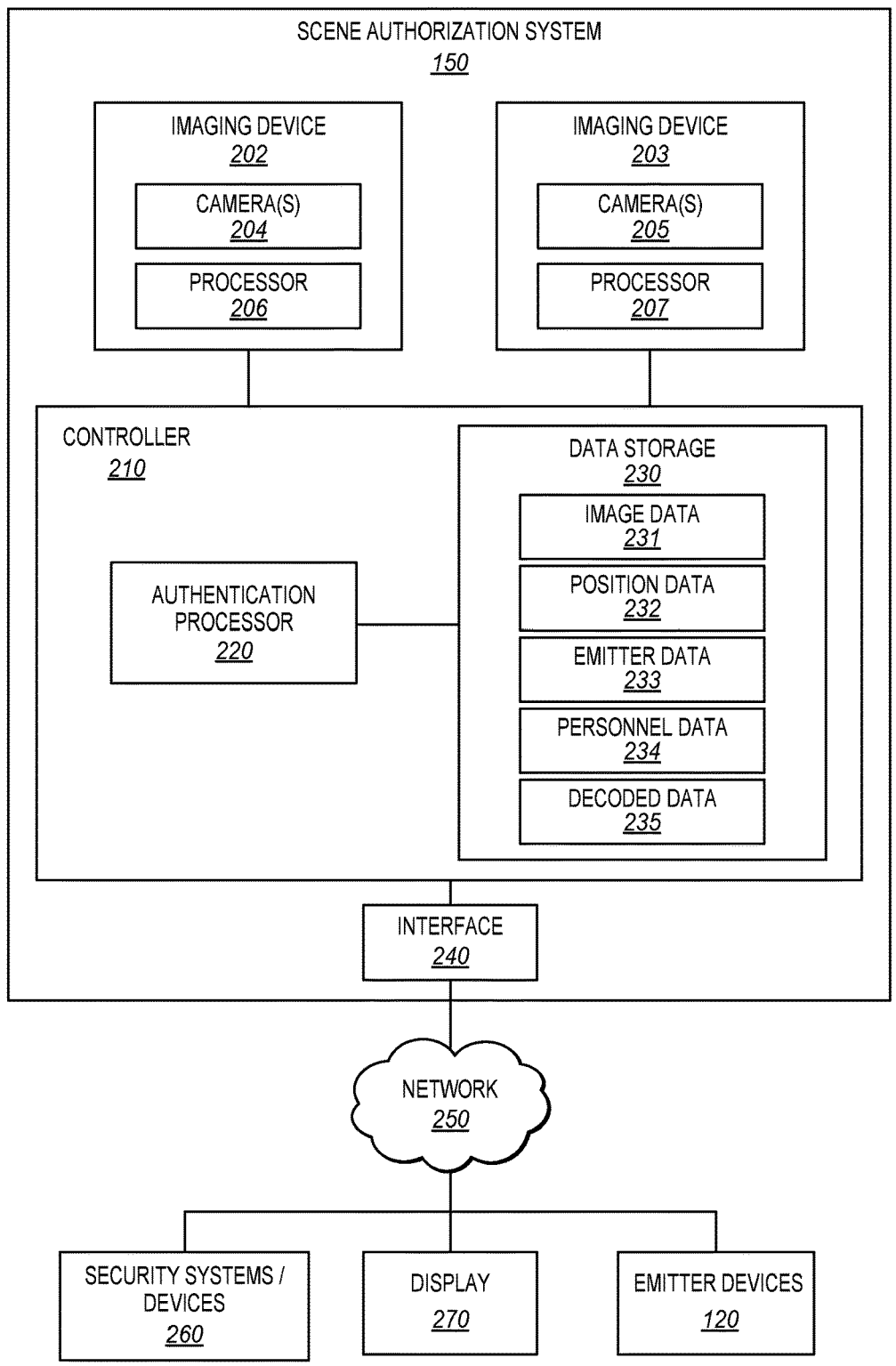
FIG. 2 is a block diagram of a scene authorization system in an exemplary embodiment.

FIG. 2 is a block diagram of a scene authorization system 150 in an exemplary embodiment. The scene authorization system 150 may include one or more imaging device(s) 202-203, each having one or more respective camera(s) 204-205 to capture images and processor(s) 206-207 to process the images. The processed image data may be sent to a controller 210 that controls the overall operation of the scene authorization system 150. Alternatively or additionally, the controller 210 may receive/process raw image data from the imaging devices 202-203 or from an external camera (e.g., camera 102 of FIG. 1).

The controller 210 includes an authentication processor 220 to authenticate persons 110 or objects based on information stored in data storage 230. Data storage 230 may include image data 231, position data 232, emitter data 233, personnel data 234, and decoded data 235. The communication medium for the controller 210 to any other component may be a wired connection or a wireless connection and the scene authorization system 150 also includes an interface 240 to communicate over one or more wired or wireless networks 250. The scene authorization system 150 may exchange messages with security systems or devices 260 such as a security office, motion detectors 106, RFID systems, etc. The scene authorization system 150 may also include or communicate with a display 270 that warns users or personnel of security issues. In some embodiments, the scene authorization system 150 may communicate with the emitter devices 120 over the network 250. Alternatively or additionally, a local wired connection may be established to synchronize the patterns emitted by the emitter devices 120 with the emitter data 233 stored in the data storage 230 of the scene authorization system 150.

Figure 3:
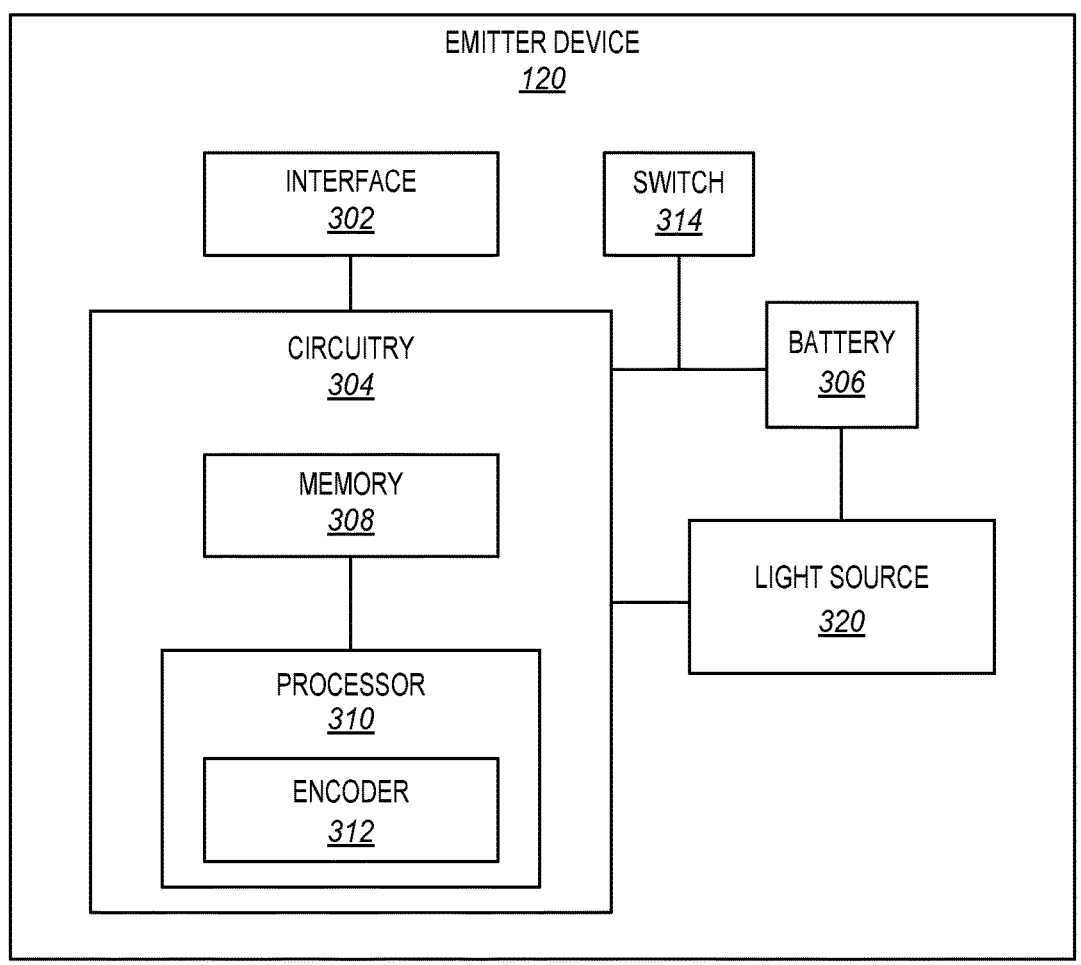
FIG. 3 is a block diagram of an emitter in an exemplary embodiment.

FIG. 3 is a block diagram of an emitter device 120 in an exemplary embodiment. In some embodiments, the emitter device 120 includes a clip, lanyard, or other attachment mechanism that enables the emitter device 120 to be worn by the persons. In other embodiments, the emitter device 120 may be a component of another system or device such as a smartphone. The emitter device 120 includes an interface 302 for communicating over a wireless or wired medium and also includes circuitry 304 with a processor 310 and memory 308. The processor 310 implements an encoder 312 which is any device operable to encode one or more light source(s) 320 of the emitter device 120. The light source 320 may include Light Emitting Diodes (LEDs) or some other source for emitting light. In some embodiments, the light source 320 emits visible light. Alternatively or additionally, the light source 320 may emit near infrared (IR) electromagnetic radiation. As such, the term light may include any wavelength in the electromagnetic spectrum that is visible to persons 110 and/or that is detectably by the cameras 102/204/205. The light source 320 and/or the circuitry 304 may be powered via a battery 306.

The encoder 312 may encode the light source 320 according to a variety of encoding techniques. In one embodiment, the encoder 312 encodes the light source 320 with a cryptographic sequence. Alternatively or additionally, the encoder 312 may implement any time-varying coded sequence for which the emitter device 120 and the scene authorization system 150 mutually agree for authentication, such as a rolling code or a primitive polynomial stream cipher. When the encoder 312 is activated, the light source 320 encodes or modulates an identification code into the light/infrared carrier to emit the encoded pattern 122 that is unique to the emitter device 120. The identification code may be stored in the emitter data 233 to correlate identification codes and the emitter devices 120 in the data storage 230 at the scene authorization system 150. The emitter device 120 may also include a switch 314 or button which may be toggled by a user of the emitter device 120. In response to being toggled, the switch 314 is configured to alter the encoded pattern 122 emitted by the emitter device 120. The scene authorization system 150 may be configured to recognize this alteration to detect a predefined message as a result of the user toggling the switch 314. For instance, a wearer of the emitter device 120 may surreptitiously indicate a distress condition by toggling the switch 314 to warn the scene authorization system 150 of the condition.

The controller 210 of the scene authorization system 150 and the processor 310 of the emitter device 120 may comprise hardware, software, or a combination of hardware and software. For example, controller 210 may include a processor, which includes any electronic circuits and/or optical circuits that are able to perform functions. For example, a processor may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel Core processors, Advanced Reduced Instruction Set Computing (RISC) Machines (ARM) processors, etc. The controller 210 may also include a memory, which may include any electronic circuits, optical circuits, and/or magnetic circuits that are able to store data.

Figure 4:
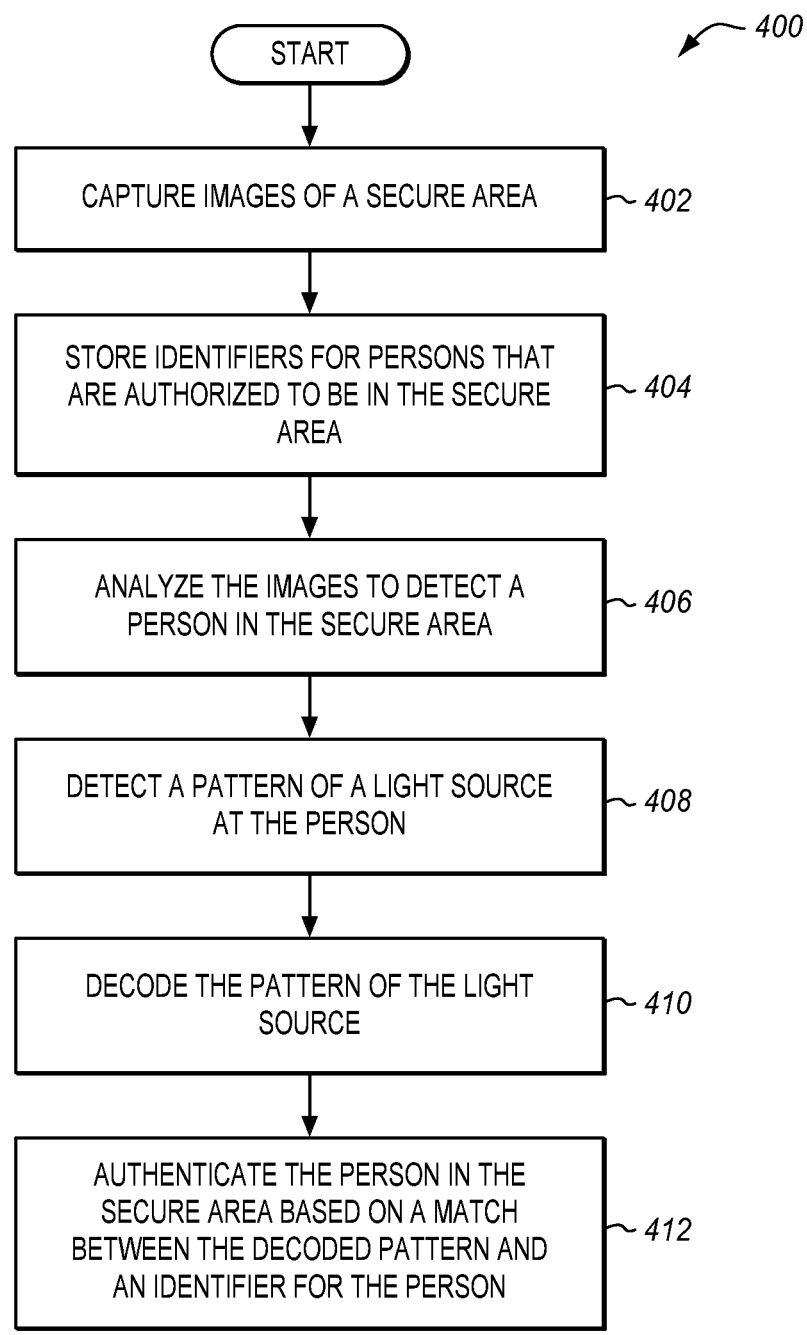
FIG. 4 is a flow chart illustrating a method of authorizing personnel in a secure area in an exemplary embodiment.

FIG. 4 is a flow chart illustrating a method 400 of authorizing personnel in a secure area in an exemplary embodiment. The steps of method 400 will be described with respect to surveillance system 100, the scene authorization system 150, and the emitter device 120 of FIGS. 1-3, although one skilled in the art will understand that the methods described herein may be performed by other devices or systems not shown. The steps of the methods described herein are not all inclusive and may include other steps not shown. The steps for the flow charts shown herein may also be performed in an alternative order.

In step 402, a camera (e.g., cameras 102/204/205) captures images of a secure area. The processor(s) 206-207 associated with the cameras 204-205 may process video data and forward the processed image data 231 to the data storage 230. Alternatively or additionally, the authentication processor 220 may process raw image data from an external camera (e.g., camera 102) and store the processed image data 231 in the data storage 230. The processed image data 231 may include coordinate data for various objects in the image data. For example, the imaging devices 202-203 may track position data for one or more object(s) in the scene and provide coordinate data for the objects in the image data 231. The coordinate data may describe two or three dimensional positions of an object in a Cartesian coordinate system and/or describe the trajectory of the object in a scene, such as with a direction vector.

In step 404, the controller 210 stores identifiers for persons that are authorized to be in the secure area. As such, the controller 210 may store emitter data 233 that includes identification codes for emitter devices 120. The emitter data 233 of a particular emitter device 120 may be assigned to the personnel data 234 describing the identity of a particular person 110 expected to be wearing or holding that particular emitter device 120. Thus, the identifiers for persons that are authorized to be in the secure area may be associated with an identification code of the emitter devices 120 in the data storage 230.

In step 406, the controller 210 analyzes the images to detect a person in the secure area. The presence of a person or object in the field of view 104 of the cameras 102/204/205 may be detected via imaging processing techniques to detect motion or via one or more of the motion detectors 106. For instance, the processors 206-207 may include objection recognition to determine if a person or particular type of object is in view of the cameras 204-205. The controller 210 may store a segment of the image data that relates to the presence of the person or object.

In step 408, the controller 210 detects a pattern of a light source attached to the person. That is, the controller 210 may target a pixel area around the image data related to the person or object to determine if a light source corresponding to the light source(s) 320 of the emitter device(s) 120 is attached to the person or object or is within a threshold distance to the person or object. Moreover, the controller 210 may analyze the image data 231 to detect a pattern of the light source 320.

In step 410, the controller 210 decodes the pattern of the light source. The authentication processor 220 may decode or demodulate the detected pattern to obtain decoded data 235. The authentication processor 220 may implement any number of decoding techniques to recover an identification code of the emitter device 120.

In step 412, the controller 210 authenticates the person in the secure area based on a match between the decoded pattern and an identifier for the person. As such, the authentication processor 220 may compare the decoded data 235 with the emitter data 233 to determine if there is match. If the decoded data 235 matches the identification code in the emitter data 233, the presence of the person or object in the scene may be validated.

Figure 5:
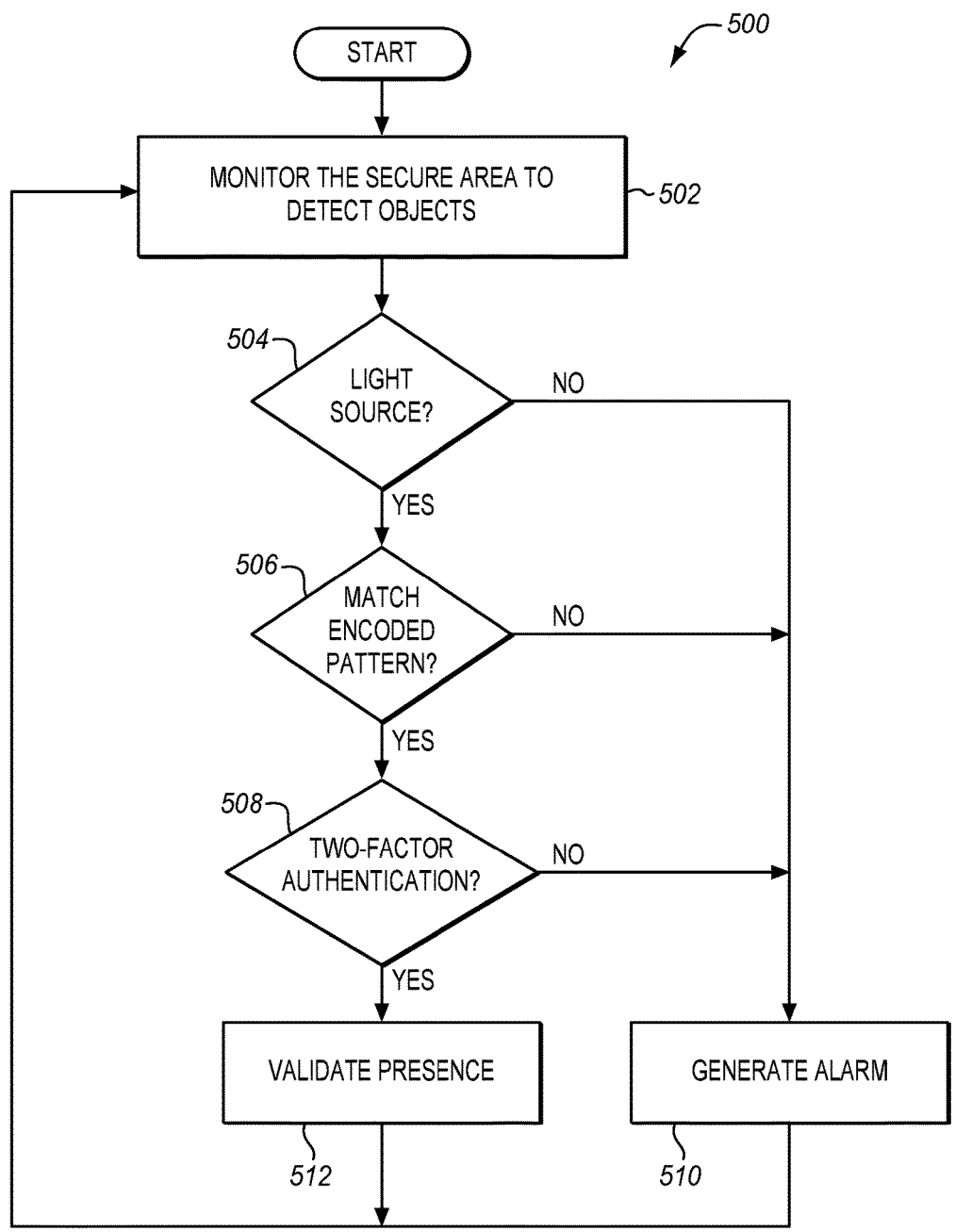
FIG. 5 is a flow chart illustrating a method of authorizing personnel in a secure area in another exemplary embodiment.

FIG. 5 is a flow chart illustrating a method 500 of authorizing personnel in a secure area in another exemplary embodiment. The steps of method 500 will be described with respect to surveillance system 100, the scene authorization system 150, and the emitter device 120 of FIGS. 1-3, although one skilled in the art will understand that the methods described herein may be performed by other devices or systems not shown. The steps of the methods described herein are not all inclusive and may include other steps not shown. The steps for the flow charts shown herein may also be performed in an alternative order.

In step 502, a camera (e.g., cameras 102/204/205) monitors a secure area to detect objects (e.g., persons, facility equipment, vehicles, etc.). In step 504, the controller 210 determines whether any of the light sources 320 of the emitter devices 120 known to the scene authorization system 150 are attached to the persons 110 or objects within in the field of view 104 of the cameras 102/204/205. If so, method 500 proceeds to step 506 where the controller 210 determines whether the pattern emitted by any of the light source 320 matches a pattern that is known to the scene authorization system 150. If so, method 500 proceeds to step 508 where the controller 210 determines whether two-factor authentication is to be performed.

If the determination at any of steps 504-508 is no, the controller 210 generates an alarm at step 510. Otherwise, the method 500 proceeds to step 512 where the controller 210 validates the presence of the person 110 wearing the emitter device 120. For example, the controller 210 may send an alarm message/notification to the security systems/devices 260 or the display 270 to warn security personnel of potential security breaches. The controller 210 may identify the person that is wearing the emitter device 120 and reference the personnel data 234 (e.g., security clearance level, authorized locations, actions, etc.) to determine whether to perform another authentication process. For instance, the controller 210 may determine that the person 110 is located within a region of the secure area that is off-limits to a security level of that person 110, and in response, generate an instruction to authenticate the person 110 with the RFID reader 108 to validate their presence in the region. Alternatively or additionally, the controller 210 may send an instruction to the emitter device 120 (or smartphone associated with the emitter device 120) to generate a sound or visible light (e.g., via the light source 320) that indicates a warning. In another example, the controller 210 may direct the imaging devices 202-203 to record and/or flag image data related to instances in which a person 110 is present in the absence of the light source 320 and/or the encoded pattern 122. Steps 502-512 may be repeated as necessary to provide continuous, real-time monitoring of a secured area.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A system comprising:
a camera configured to capture images of a secure area;
memory configured to store identifiers for persons that are authorized to be in the secure area;
a light source attached to a person; and
a processor communicatively coupled with the camera and the memory, the processor configured to analyze the images to detect the person in the secure area, to detect a light pattern produced by the light source attached to the person, to decode the light pattern produced by the light source, and to authenticate the person in the secure area based on a match between the decoded light pattern and an identifier for the person.

2. The system of claim 1 wherein:
the light pattern produced by the light source is encoded with a cryptographic sequence; and
the processor is configured to decode the light pattern produced by the light source based on the cryptographic sequence.

3. The system of claim 1 wherein:
the light pattern produced by the light source is encoded with a rolling code; and
the processor is configured to decode the light pattern by the light source based on the rolling code.

4. The system of claim 1 wherein:
the light source includes a battery and a Light Emitting Diode (LED) to produce the light pattern.

5. The system of claim 1 wherein:
the light source emits near infrared (IR) electromagnetic radiation.

6. The system of claim 1 wherein:
the light source emits visible light.

7. The system of claim 1 wherein:
the processor is configured to generate an alarm message in response to determining that the person in the secure area does not have an attached light source.

8. The system of claim 1 wherein:
the processor is configured to identify a security clearance level of the person based on the decoded light pattern, and to generate a message that instructs the person to perform another authentication process based on the security clearance level.

9. The system of claim 1 wherein:
the processor is configured to track a position of the person, and to authenticate the person based on a combination of the position of the person and the decoded light pattern.

10. A method comprising:
capturing images of a secure area;
storing identifiers for persons that are authorized to be in the secure area;
analyzing the images to detect a person in the secure area;
detecting a light pattern produced by a light source attached to the person;
decoding the light pattern produced by the light source; and
authenticating the person in the secure area based on a match between the decoded light pattern and an identifier for the person.

11. The method of claim 10 further comprising:
decoding the light pattern produced by the light source based on a cryptographic sequence encoded in the light pattern.

12. The method of claim 10 further comprising:
decoding the light pattern produced by the light source based on a rolling code encoded in the light pattern.

13. The method of claim 10 further comprising:
identifying a security clearance level of the person based on the decoded light pattern; and
generating a message that instructs the person to perform another authentication process based on the security clearance level.

14. The method of claim 10 further comprising:
tracking a position of the person; and
authenticating the person based on a combination of the position of the person and the decoded light pattern produced by the light source.

15. A non-transitory computer readable medium embodying programmed instructions executed by a processor, wherein the instructions direct the processor to:
capture images of a secure area;
store identifiers for persons that are authorized to be in the secure area;
analyze the images to detect a person in the secure area;
detect a light pattern produced by a light source attached to the person;
decode the light pattern produced by the light source; and
authenticate the person in the secure area based on a match between the decoded light pattern and an identifier for the person.

16. The computer readable medium of claim 15 wherein the instructions further direct the processor to:
decode the light pattern produced by the light source based on a cryptographic sequence encoded in the light pattern.

17. The computer readable medium of claim 15 wherein the instructions further direct the processor to:
decode the light pattern produced by the light source based on a rolling code encoded in the light pattern.

18. The computer readable medium of claim 15 wherein the instructions further direct the processor to:
decode the light pattern produced by the light source based on a primitive polynomial stream cipher encoded in the light pattern.

19. The computer readable medium of claim 15 wherein the instructions further direct the processor to:
identify a security clearance level of the person based on the decoded light pattern produced by the light source attached to the person; and
generate a message that instructs the person to perform another authentication process based on the security clearance level.

20. The computer readable medium of claim 15 wherein the instructions further direct the processor to:
track a position of the person; and
authenticate the person based on a combination of the position of the person and the decoded light pattern produced by the light source.

* * * * *